US007448475B2

(12) United States Patent
Mourad et al.

(10) Patent No.: US 7,448,475 B2
(45) Date of Patent: Nov. 11, 2008

(54) DEVICE FOR CONTROLLING A MOTOR-VEHICLE SERVO-ASSISTED BRAKE

(75) Inventors: Kamal Mourad, Turin (IT); Claudio Priotti, Cavour (IT); Salvatore Melis, Rivoli (IT)

(73) Assignee: Sila Holding Industriale S.p.A., Nichelino (Turin) (IT)

( * ) Notice: Subject to any disclaimer, the term of this patent is extended or adjusted under 35 U.S.C. 154(b) by 0 days.

(21) Appl. No.: 11/121,936

(22) Filed: May 5, 2005

(65) Prior Publication Data

US 2005/0250382 A1    Nov. 10, 2005

(30) Foreign Application Priority Data

May 6, 2004    (IT)    ............... TO2004A0291

(51) Int. Cl.
*F16D 65/14*    (2006.01)
(52) U.S. Cl. .................. 188/2 D; 188/1.11 E
(58) Field of Classification Search ............. 200/543; 188/2 D, 1.11 E, 265; 303/20; 254/231, 254/232, 233, 234, 243
See application file for complete search history.

(56) References Cited

U.S. PATENT DOCUMENTS

| 3,435,165 | A | * | 3/1969 | Lombard | .............. 200/61.89 |
| 3,591,748 | A | * | 7/1971 | Holden | ................ 200/546 |
| 3,703,620 | A | * | 11/1972 | Watanabe | ................ 200/543 |
| 4,304,322 | A | * | 12/1981 | Beccaris | ................ 192/111 A |
| 4,351,418 | A | * | 9/1982 | Woodring et al. | ........ 188/24.22 |
| 4,464,950 | A | * | 8/1984 | Deligny | ................ 74/501.5 R |
| 4,795,864 | A | * | 1/1989 | Leorat | .................... 200/61.91 |
| 4,854,186 | A | * | 8/1989 | Jakob et al. | ............. 74/501.5 R |
| 5,097,931 | A | * | 3/1992 | Focqueur et al. | ............. 192/83 |
| 5,117,958 | A | * | 6/1992 | Focqueur et al. | ............. 192/83 |
| 5,119,913 | A | * | 6/1992 | Focqueur et al. | ............. 192/83 |
| 6,609,595 | B2 |   | 8/2003 | Flynn et al. | |
| 6,655,507 | B2 | * | 12/2003 | Miyakawa et al. | .......... 188/171 |
| 2002/0166288 | A1 | * | 11/2002 | LeGallo | ...................... 49/352 |

FOREIGN PATENT DOCUMENTS

| WO | WO 98/56633 | 12/1998 |
| WO | WO 9856633 A1 * | 12/1998 |
| WO | WO 2004/020265 A1 | 3/2004 |
| WO | WO 2004/110835 A1 | 12/2004 |

* cited by examiner

*Primary Examiner*—Robert A. Siconolfi
*Assistant Examiner*—Vu Q Nguyen
(74) *Attorney, Agent, or Firm*—Sughrue Mion, PLLC

(57) ABSTRACT

The device comprises: an actuator unit arranged to apply a tension force on a pair of operating cables provided with a sheath; and a force sensing unit for providing a signal indicative of the force applied the sheath by either of the two operating cables (12a). The force sensing unit comprises: a pack of Belleville springs coupled to an end portion of the sheath and arranged to deform as a result of the tension force applied by the actuator unit on the operating cable; and a Hall position sensor for detecting the displacement of the end portion of the sheath as a result of the deformation of the pack of springs.

10 Claims, 3 Drawing Sheets

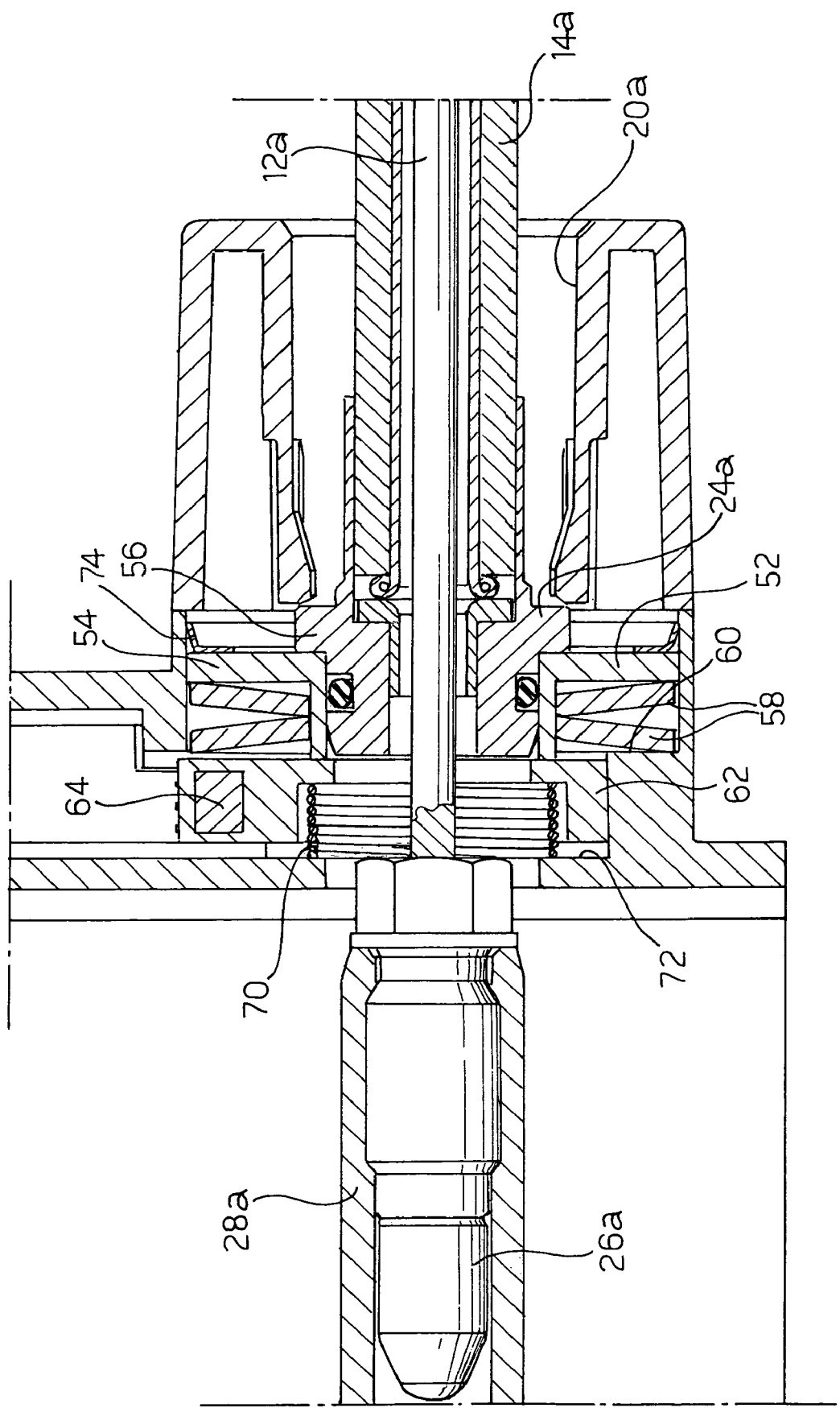

DEVICE FOR CONTROLLING A MOTOR-VEHICLE SERVO-ASSISTED BRAKE

BACKGROUND OF THE INVENTION

The present invention relates to a device for controlling a servo-assisted brake for a motor-vehicle, in particular a parking brake, of the type comprising an actuator unit arranged to apply a tension force on at least one brake operating cable and a force sensing unit adapted to provide a signal indicative of the force applied on the operating cable.

A control device of this type is disclosed in International Patent Application WO 98/56633. This control device comprises an electric motor which drives, through a gear reduction unit, a male-and-female screw mechanism, in which the screw is rigidly connected to an actuating member so as to cause this latter to move axially. An end of the operating cable is mounted on the actuating member through a pack of springs, in such a manner that it can move axially relative to the actuating member against the resilient biasing action exerted by the spring pack. A force sensing unit for detecting directly the force exerted on the operating cable by the actuating member is associated to the actuating member. The sensing unit comprises a movement sensor which senses the relative movement between the actuating member and the operating cable due to the compression of the spring pack.

The main shortcoming of this device is represented by the loss of operability in case of failure of the force sensing unit, since this latter is directly mounted on the drive chain between the operating cable and the screw-type actuator.

A further example of a control device of the above-specified type is known from International Patent Application WO 02/57122. This known control device comprises an electric motor which drives, through a gear reduction unit, the rotation of a screw meshing with an axially movable nut screw. The operating cable is attached at an end to the nut screw so as to be pulled or released by the latter. The screw is mounted axially floating and is pulled, as a result of the force exerted on operating cable and therefore on the nut screw, against a spring interposed between the end of the screw facing the cable and an abutment surface of the device. A position sensor senses the compression of the spring and enables to establish the force exerted by the control device on the operating cable.

Compared to the prior art discussed above, this control device provides for a force sensing unit uncoupled from the operating cable, since it is not directly interposed between the cable and the driving screw. However, this device has the shortcoming of considerable axial size. In fact, in order for the control device to be able to operate also in case of failure of the force sensing unit (that is to say, of the spring on which the screw acts), the length of both the threaded portion of the screw and the portion of the screw on which the output gear wheel of the gear reduction unit is fitted has to be increased by an amount equal to the travel which would result from a possible breakage, amount which might even be equal to the overall rest length of the spring.

SUMMARY OF THE INVENTION

It is the object of the present invention to provide a device for controlling a motor-vehicle brake, which is able to eliminate the above shortcomings of the prior art.

This and other objects are fully achieved according to the invention by a control device having the characteristics set forth in the characterising portion of Claim 1.

BRIEF DESCRIPTION OF THE DRAWINGS

The characteristics and the advantages of the present invention will become apparent from the detailed description which follows, given purely by way of non-limiting example with reference to the appended drawings, in which:

FIG. 3 is an axial section view of the sensing unit of FIG. 2.

DESCRIPTION OF PREFERRED EMBODIMENTS

Figure 1:
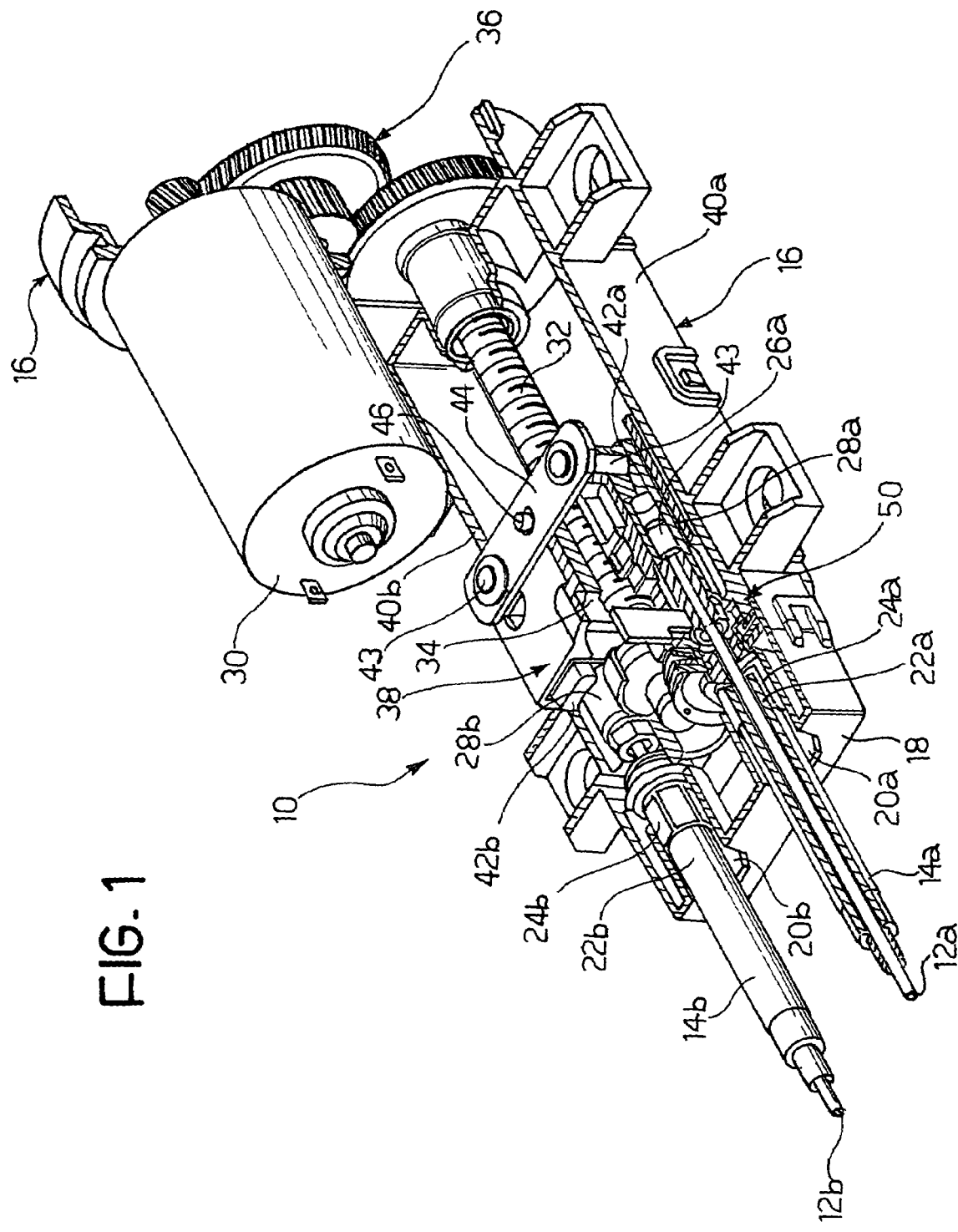
FIG. 1 is an overall perspective, partially sectioned view of a device for controlling a motor-vehicle brake, in particular a servo-assisted parking brake, according to a preferred embodiment of the present invention.

By referring first to FIG. 1, numeral 10 generally indicates a control device intended to control a parking brake of a motor-vehicle (of per-se-known type and not shown) via a pair of operating cables 12a, 12b sliding within respective sheaths 14a, 14b.

The device 10 comprises an outer housing 16 (partially shown), a front face 18 of which has a pair of cylindrical seats 20a, 20b in which end portions 22a and 22b of the two sheaths 14a and 14b are received. A sheath end 24a, 24b is fitted on each end portion 22a, 22b, respectively, of the sheaths 14a, 14b so as to axially slide in the respective cylindrical seat 20a, 20b. Each operating cable 12a, 12b passes through the respective sheath end 24a, 24b and is connected with an end portion 26a, 26b thereof to a respective cable end 28a, 28b.

The control device further comprises an actuating unit which includes a motor 30, for example an electric motor, and a mechanism for converting rotary motion into linear motion, in the shown example a mechanism having a screw 32 and a nut screw 34. The screw 32 is rotated by the motor 30 through a gear reduction unit 36. The nut screw 34 meshes with the screw 32 and is housed in a nut-screw support, generally indicated con 38, axially sliding along a pair of side walls 40a, 40b of the housing 16. The nut screw 34 is prevented from rotating and is fast for translation with the nut-screw support 38, whereby as a result of the rotation imparted by the motor 30 to the screw 32, the nut screw 34 and the nut-screw support 38 axially shift as a rigid body. In the nut-screw support 38 there are also housed, so as to slide axially, a pair of hollow support elements 42a, 42b, to both of which a respective cable end 28a, 28b is attached. The two hollow support elements 42a, 42b are connected, by means of connection pins 43, to the ends of a balance lever 44 articulated in a centre point 46 to the nut-screw support 38. The two hollow support elements 42a, 42b, together with the cable ends 28a, 28b, can thus be drawn axially by the nut-screw support 38, the balance lever 44 serving to balance the forces exerted by the actuating unit on the two operating cables 12a, 12b.

When the electric motor 30 is activated, the rotation of the screw 32 brings about the translation of the nut screw 34 and of all the mechanical members connected thereto, that is to say, the nut-screw support 38, the balance lever 44, the hollow support elements 42a, 42b, the cable ends 28a, 28b and hence the operating cables 12a, 12b. Consequently, tension forces are generated on the operating cables 12a, 12b and compression forces are generated on the sheaths 14a, 14b which are directly proportional to the restraining reactions of the mechanical system (parking brake system) controlled by the device 10. The same force acts on the cables 12a, 12b, and therefore on both the sheaths 14a, 14b, since the balance lever 44 compensates possible lacks of balance in the mechanical system controlled by the device 10. The compression force on the sheath 14a acts on a force sensor unit, generally indicated 50, which will be described in detail hereinafter, whereas the compression force on the sheath 14b acts directly on the housing 16 of the control device. In fact, thanks to the use of the balance lever 44, only one force sensing unit associated to either of the sheaths is needed.

Figure 2:
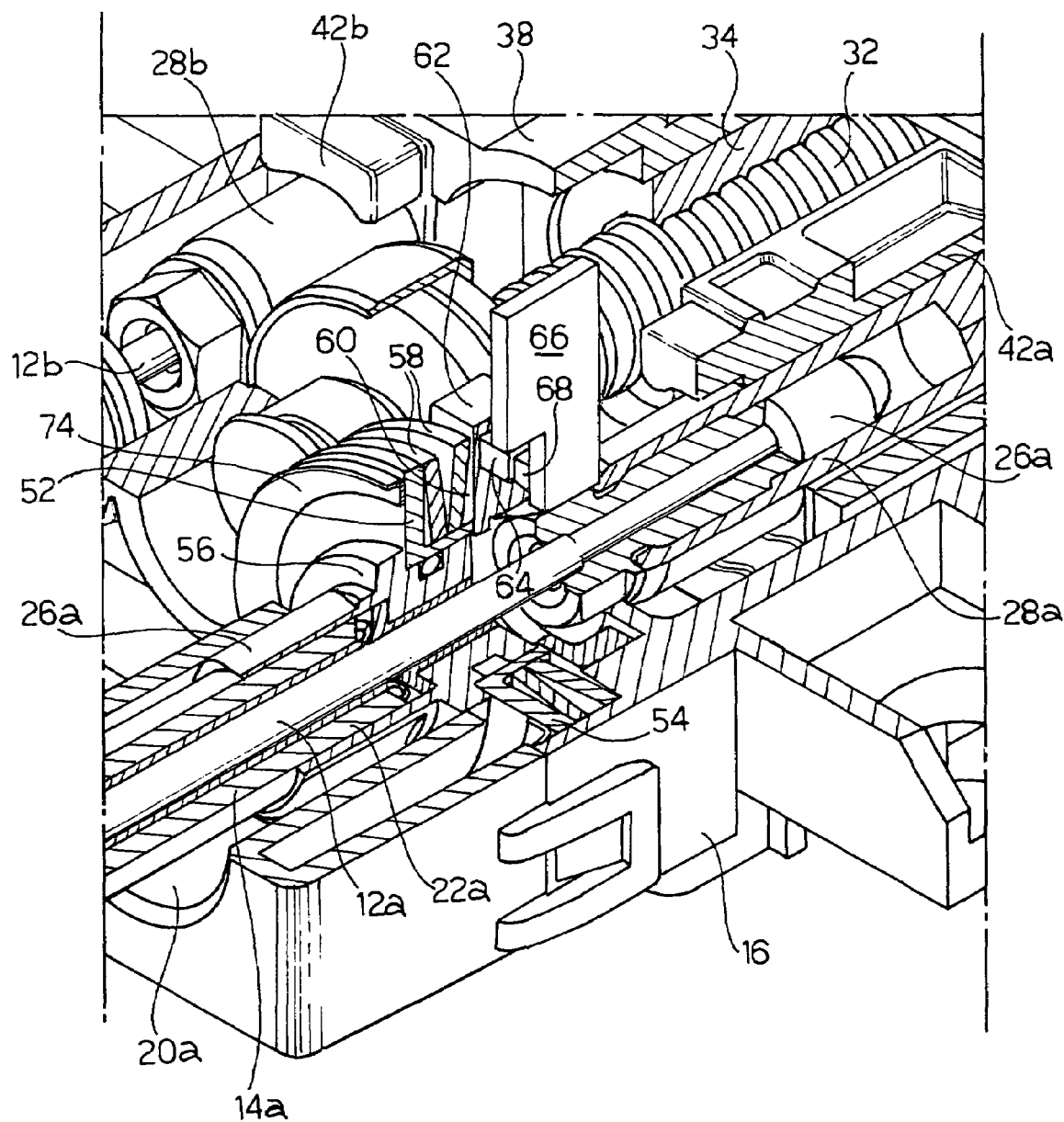
FIG. 2 is a perspective view which shows in detail the sensing unit of the control device of FIG. 1.

Referring now in particular to FIGS. 2 and 3, the force sensing unit 50 comprises:
- a spacer 52 provided with radial flange 54 on which a shoulder 56 of the sheath end 24a rests;
- a pack of springs 58, preferably Belleville springs, in order that the axial dimensions of the device are limited, interposed between an abutment surface 60 of the housing 16 and the radial flange 54 of the spacer 52;
- a cursor 62 against which the spacer 52 abuts;
- a permanent magnet 64 carried by the cursor 62;
- a printed circuit 66 which supports a Hall sensor. 68; and
- a take-up spring 70 interposed between the cursor 62 and another abutment surface 72 of the housing 16.

It is also advantageously provided a locking ring 74 which abuts against the radial flange 54 of the spacer 52 in order axially to hold the various components of the sensing unit listed above.

The force sensing unit 50 operates as follows. The compression force on the sheath 14a acts on the pack of springs 58 through the sheath end 28a and the spacer 52, thereby bringing about a reduction in the length thereof which is proportional to the force exerted. The displacement of the spacer 52 and of the cursor 62 resulting from the shortening of the pack of springs 58 is detected by the Hall sensor 68, which can sense the variation of the magnetic flux produced by the variation of the relative position with respect to the permanent magnet 64 carried by the cursor 62. The output signal of the sensor 68, which is indicative of the value of the force applied on the sheath 14a, and hence on the operating cable 12a, is sent to an electronic control unit (not shown) arranged to manage the activation or deactivation of the motor 30.

Naturally, the principle of the invention remaining unchanged, embodiments and manufacturing details may vary widely from those described and illustrated purely by way of non-limiting example.

For example, even though the control device according to the invention has been described with reference to an embodiment with two operating cables, it is clearly feasible also an embodiment with one cable only. The arrangement with two cables connected to each other by means of a balance lever is however preferable, since it allows to halve the value of the force which has to be detected by the force sensor and therefore to reduce the size of the sensor.

What is claimed is:

1. A control device for a motor-vehicle brake, in particular for a parking brake, comprising:
   - a housing;
   - an actuator unit accommodated in the housing and arranged to apply a tension force on at least one operating cable provided with a sheath; and
   - a force sensing unit accommodated in the housing for providing a signal indicative of the force applied on the said at least one operating cable;
   - wherein the force sensing unit is arranged to provide a direct measure of the force acting on the sheath; and
   - wherein the force sensing unit comprises at least one spring interposed between an abutment surface of the housing and an end portion of the sheath so as to deform as a result of the tension force applied by the actuator unit on the at least one operating cable, and a displacement sensor for detecting the deformation of the at least one spring wherein the at least one spring directly contacts or directly reacts with the abutment surface of the housing.

2. The device of claim 1, wherein the said at least one spring is a Belleville spring.

3. The device of claim 1, wherein the displacement sensor comprises:
   - a permanent magnet arranged to displace upon deformation of the at least one spring; and
   - a Hall sensor for detecting the displacement of the permanent magnet.

4. The device of claim 1, further comprising a spacer interposed between the said end portion of the sheath (14a) and the at least one spring.

5. The device of claim 3, further comprising a movable cursor carrying the permanent magnet.

6. The device of claim 5, wherein the cursor is arranged to be moved by a spacer interposed between the said end portion of the sheath and the at least one spring.

7. The device of claim 1, further comprising means for taking up play which are interposed between the said end portion of the sheath and the housing.

8. The device of claim 7, wherein the said means for taking up play comprise a spring abutting against a movable cursor which carries a permanent magnet arranged to displace upon deformation of the at least one spring.

9. The device of claim 1, wherein the actuator unit comprises an electric motor and a mechanism having a screw and a nut screw, the nut screw being connected to the at least one operating cable.

10. The device of claim 9, further comprising a balance lever which is connected to a pair of operating cables and is articulated to the nut screw.

* * * * *